United States Patent [19]

Jung et al.

[11] 4,171,864
[45] Oct. 23, 1979

[54] IDENTIFICATION DOCUMENT AND DISPLAY UNIT THEREFOR

[75] Inventors: Claus Jung, Otterfing; Klaus Frank, Breitbrunn, both of Fed. Rep. of Germany

[73] Assignees: Unitec GmbH & Co. KG; R. Oldenboug Graphische Betriebe GmbH, both of Fed. Rep. of Germany

[21] Appl. No.: 627,864

[22] Filed: Oct. 31, 1975

[30] Foreign Application Priority Data

Oct. 31, 1974 [DE] Fed. Rep. of Germany ....... 2451732

[51] Int. Cl.² ............................................. G02B 27/00
[52] U.S. Cl. ...................................... 350/3.61; 40/2.2; 235/467; 235/470; 283/7; 350/3.85
[58] Field of Search ................. 350/3.5; 235/61.11 R, 235/61.11 M, 61.7 B; 250/566

[56] References Cited

U.S. PATENT DOCUMENTS

| 3,894,756 | 7/1975 | Ward | 350/3.5 |
| 3,924,105 | 12/1975 | Gassino et al. | 250/566 X |

Primary Examiner—John K. Corbin
Assistant Examiner—John D. Lee
Attorney, Agent, or Firm—Carig and Antonelli

[57] ABSTRACT

An identification document contains idential data both in visual and holographic form. Simultaneous display of the visual data and holographic data in closely adjacent relationship permits ready detection of counterfeiting, alteration and misuse.

28 Claims, 6 Drawing Figures

IDENTIFICATION DOCUMENT AND DISPLAY UNIT THEREFOR

This invention relates to an identification document containing both visual data and data that are invisible to the naked eye. The identification document may be a cheque card, a credit card, an identity document or any other document containing certain information for identifying a person, an object or a right.

Identification documents of this type are generally made from paper, plastics material and/or punched sheet metal. Efforts have been made by the producers to incorporate or apply predetermined features at least partly invisible to the naked eye, such as water-marks, mottle fibres, chemical substances, safety printing and the like, in order to render falsifications either difficult or recognizable.

It has been experienced in banking as well as in private and governmental criminal detection activities, however, that the securing measures taken for known identity documents are inadequate to prevent considerable damage by falsifications which are in many cases successful. Up to now, successful falsifications, particularly alterations, by means of comparatively simple and inexpensive means could not be stopped. For example, one method of altering the laminated cheque cards used in the European banking business is to split the card along a central plane in order to alter the name contained on the inner paper strip and/or to combine this part of the cheque card with an upper layer carrying a different signature. When the counterfeiter has worked with some diligence, it is impossible to recognize such cheque card as false. Efforts to prevent such falsifications by a particular structure of the card or by particular measures taken in the production of the card have been unsuccessful.

Other efforts to render falsifications obvious by encoding certain data contained on the respective identification document have likewise been fruitless. When a relatively simple code is employed, the counterfeiters will find out the code within accordingly short time. On the other hand, complicated codes require expensive decoding devices unless the persons who check the identification documents are expected to have quite unusual abilities.

In order to prevent misuse of an unadulterated identification document by an unauthorized person, it has also been common to provide on the document a picture of the entitled person in connection with other visual data. However, such pictures are as easy to alter as signatures.

It is an object of the invention to provide simple means permitting easy and ready recognition of counterfeiting, alteration and misuse of identification documents.

According to the present invention, the identification document contains certain features invisible to the naked eye in the form of a hologram in addition to containing the visual data. When part or all of the visual data is repeated in the hologram, the conformity of the visual data with the holographic data is easily and quickly verified by viewing the identification document on a simple device for displaying the hologram. In case of lacking conformity, the document checked has been either counterfeited or altered. Attempted falsification resulting in damaging or destruction of the hologram is also recognizable. While the hologram may be displayed by means of comparatively simple technical appliances, the production of the hologram requires extraordinarily expensive technical equipment which makes it practically impossible to counterfeit or alter an identification document provided with a hologram in accordance with the invention. It is a further advantage of the identification document according to the invention that a large amount of information may be stored in the hologram in a very small area which makes it possible to provide information invisible to the naked eye in addition to a replica of the visual data. Such additional information may particularly consist in a picture of the respective entitled person. Because this picture is normally invisible, the identification document cannot be misused by altering the appearance of the misuser.

Preferred embodiments of the invention will now be described in more detail with reference to the drawings, in which FIG. 1 shows a cheque card as used in the European banking business, provided with a hologram in accordance with the invention;

Figure 1:
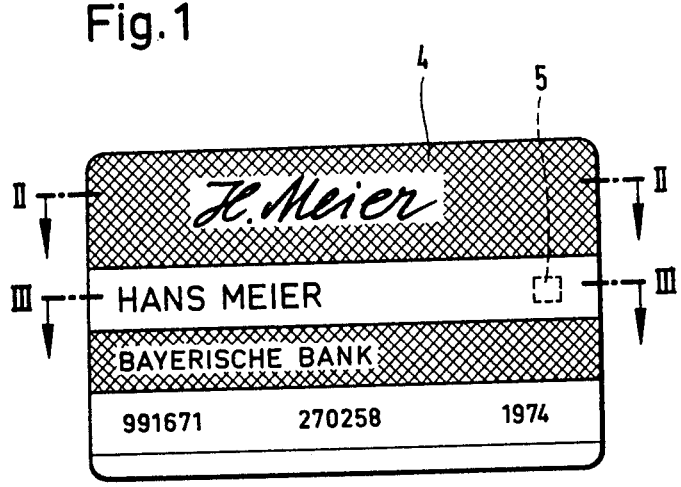
Figure 2:
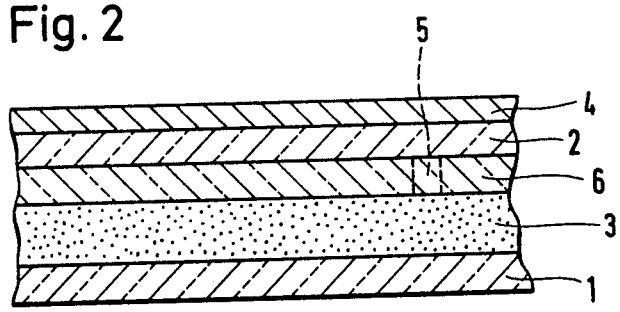
FIG. 2 is a cross-section of the card, taken along the line II—II in FIG. 1.

The cheque card of FIG. 1 is provided in a usual way with certain visual data, such as the name of the credit institute ("BAYERISCHE BANK"), the account number, the name of the owner of the account ("HANS MEIER"), and the signature of the owner. While the first three of those data are provided on a printing carrier 3 of safety paper or plastic sheet laminated between a pair of plastic support and cover sheets 1, 2, the signature is regularly carried by a paper band 4 glued or laminated onto the cover sheet 2. In addition to these visual data, the cheque card according to the invention is provided with a hologram 5 preferably disposed in one half of the card. As shown in FIG. 2, the hologram 5 may be contained in or on a further transparent plastic sheet welded between the printing carrier 3 and the cover sheet 2. According to FIG. 3, it is alternatively possible to form the hologram 5 in the transparent cover sheet 2 itself, in which embodiment the identification sheet according to the invention—disregarding the production of the hologram—requires no additional cost and labour over that required for a conventional cheque card.

When the printing carrier 3 provided with the visual data is made of an overall opaque material, the hologram 5 is produced and reconstructed by incident light. As indicated in FIG. 3, the printing carrier 3 may alternatively be provided with a cut-out 7 below the hologram 5 which may thus be produced and reconstructed by transmitted light.

Figure 3:
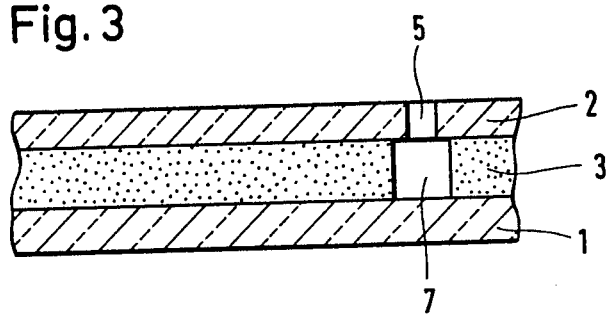
FIG. 3 is a cross-section of an alternative cheque card externally resembling the cheque card of FIG. 1, taken along the line III—III in FIG. 1.

As a carrier for the hologram, i.e. for the additional sheet 6 of FIG. 2 or the cover sheet 2 of FIG. 3, material coated with photographic substances such as silver halides may be used or thermoplastic sheets which are photo-electrically sensitized by semiconductor substances and on which a latent hologram may be produced which is developed by heating above the melting point of the sheet and fixed by cooling. In the shown embodiments, the sheet 2 or 6 carrying the hologram 5 is transparent so that the visual data below such sheet remain visible. In other applications or with a cheque card of a different structure, the hologram 5 may also be formed by incident light on an opaque material.

For producing a cheque card according to FIGS. 1 to 3, the name of the owner of the account, the account number and similar data are first placed on the printing carrier 3, which is regularly a form imprinted with the name of the credit institute and optionally provided with a cut-out 7. The hologram 5 is then produced from this printing carrier. As an optional feature, a photograph showing the owner of the account or his signature may be taken in addition to the printing carrier to form the hologram. The sheet carrying the hologram is then disposed such that the hologram is placed at a predetermined position relative to the printing carrier 3, i.e. above the cut-out 7 in case the cheque card has the structure shown in FIG. 3. The remaining sheets are then laminated together with the printing carrier 3 and, lastly, the paper band 4 is applied for receiving the signature.

Figure 4:
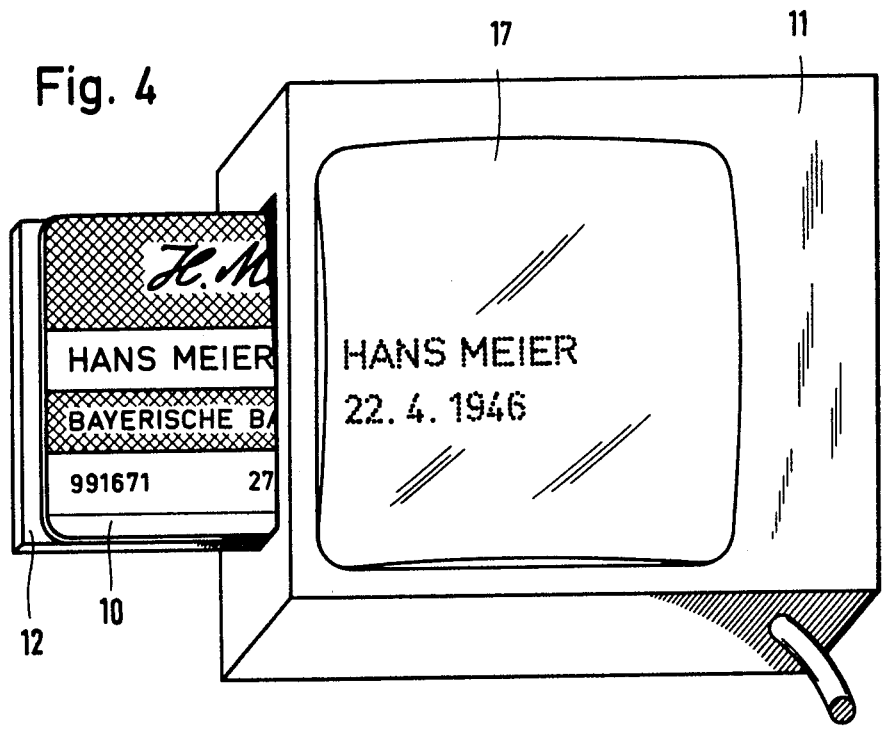
FIG. 4 is a diagrammatic perspective view of a first embodiment of a display unit according to the invention for displaying a cheque card according to FIG. 1.
Figure 5:
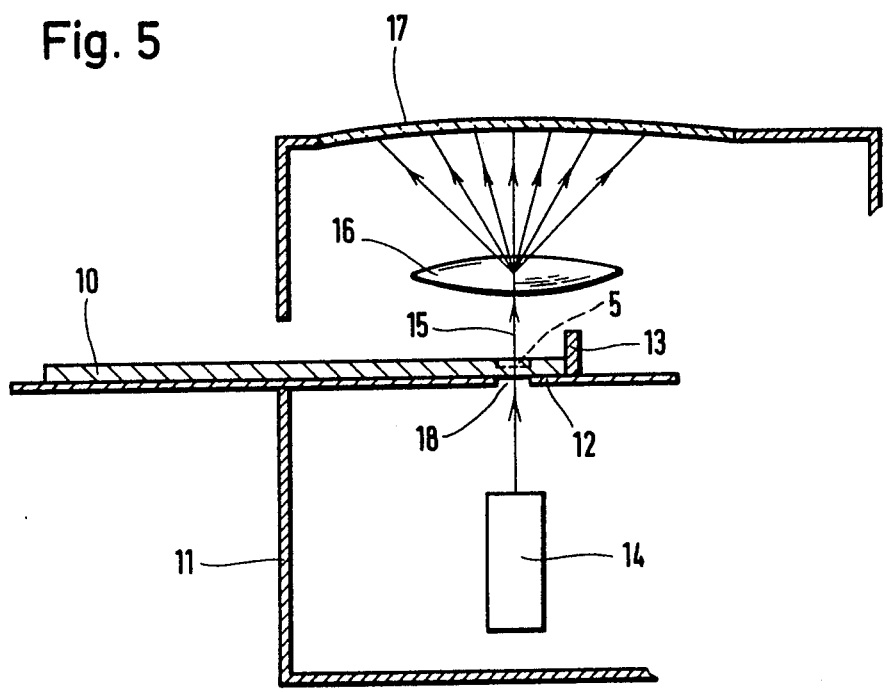
FIG. 5 is a diagrammatic cross-section of the display unit shown in FIG. 4.

As shown in FIGS. 4 and 5, a cheque card 10 is partly inserted into a display unit 11 wherein a stop 13 provided on a card guide 12 ensures proper positioning of the card 10. When the card 10 has been inserted so as to abut the stop 13, the hologram 5 is above a window 18 provided in the card guide 12, and light from a light source 14 disposed in the lower part of the display unit is transmitted through the window 18 and the hologram 5. The light beam 15 is transmitted through the hologram 5, thereby modulated by the information stored in the hologram, is projected by an optical element 16 onto a ground-glass screen 17 provided on the upper side of the display unit 11 to display an image of the holographic information. In this embodiment, the visual data and the hologram 5 on the cheque card 10 as well as the stop 13 within the display unit 11 are disposed in such a manner that, in the position shown in FIGS. 4 and 5, the essential portion of the visual data available on the portion of the card extending out of the display unit 11 may be observed simultaneously with the holographic data appearing on the screen 17, thus permitting an easy and direct comparison.

Because each point of the hologram contains the entire information stored, the position of the card 10 relative to the optical assembly comprising the light source 14 and the optical element 16 is little critical. Moreover, partial contamination of the hologram 5 does not change or mutilate the information but may, at worst, affect the quality of its representation.

Figure 6:
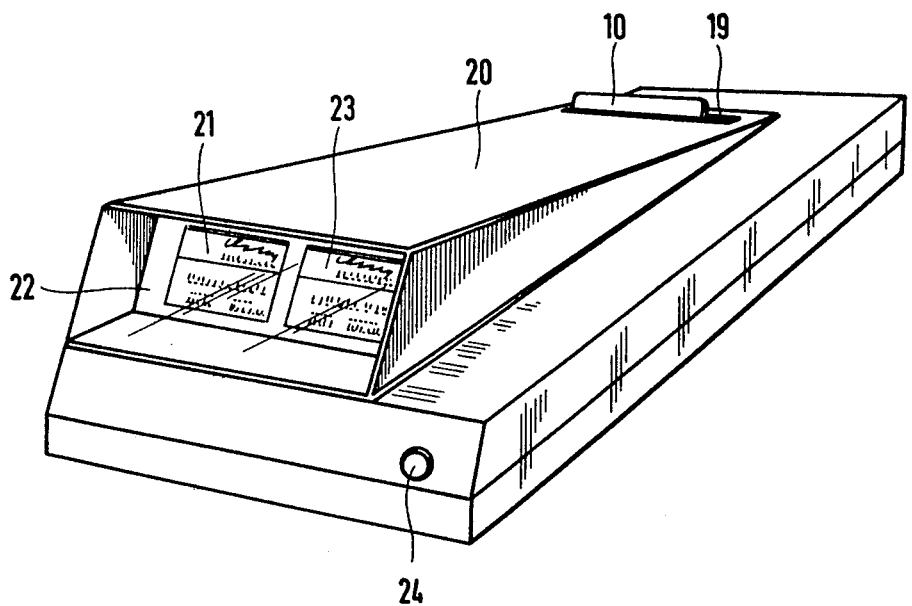
FIG. 6 is a perspective view of a second embodiment of a display unit according to the invention.

The light source 14 is a monochromatic light source, particularly a laser, emitting a coherent light beam as required for reconstructing the hologram. In the display unit of FIG. 6, the card 10 is completely inserted into a slot 19. An image 21 of the hologram is displayed in the left hand portion of a screen 22 by means of an optical arrangement which is provided within the casing 20 of the display unit and may resemble the optical arrangement of FIG. 5. Another optical arrangement (not shown) is also provided within the casing 20 for displaying an image 23 of the card 10 itself on the right hand portion of the screen 22 in about the same size as the image 21. Since the laser light used for producing the hologram image 21 and the normal light used for projecting the image 23 disturb each other, the two optical arrangements are separated within the casing 20 by means of a partition wall. The screen 22 is a vibrating ground-glass screen or a liquid crystal in order to achieve a clear reproduction of the holographic image 21 as well as of the image 23. An ejecting mechanism actuated by a push button 24 facilitates the removal of the card 10 from the slot 19.

In order to display as image of the card 10 itself and a representation of the hologram 5 at a remote location alternatively or in addition to the display on the screen 22, it is possible to couple out a portion of the hologram reconstruction beam and—possibly by means of a beam splitter—a portion of the light beam producing the image 23 and to supply those beams to a monitor via a television system.

What is claimed is:

1. Identification apparatus comprising:
   (a) an identification document carrying visual data as well as invisible features in the form of a hologram provided on said identifcation document, wherein at least portions of said visual data are identically reproduced as holographic data in said hologram;
   (b) and a display unit for displaying the information contained on said identification document with simultaneous visual display of the visual data and the holographic data in closely adjacent relationship to permit verification of conformity of the holographic and visual data, wherein said display unit comprises:
      (1) a monochromatic light source for reconstructing said hologram;
      (2) an optical arrangement for projecting the reconstructed holographic image onto a location where it may be observed together with said visual data; and
      (3) means for receiving said identification document, said receiving means being sized so as to receive only the portion of said identification document containing said hologram while leaving a portion carrying said visual data outside said display unit for direct observation.

2. Identification apparatus of claim 1, wherein said hologram contains an image of said visual data.

3. The identification apparatus of claim 2, wherein said identification document comprises a first layer, a second layer disposed on said first layer, said second layer being transparent and forming the uppermost layer as viewed by an observer; and a third layer disposed between said first and second layers, said third layer being transparent and including said hologram.

4. The identification apparatus of claim 3, wherein any layer of said identification document disposed below the layer including said hologram is transparent at least within the area below said hologram.

5. The identification apparatus of claim 2, wherein said identification document comprises a first layer and a second layer disposed on said first layer, and including said hologram, said second layer being transparent and forming the uppermost layer as viewed by an observer.

6. The identification apparatus of claim 5, wherein any layer of said identification document disposed below the layer including said hologram is transparent at least within the area below said hologram.

7. The identification apparatus of claim 2, wherein said hologram contains an image of the person to be identified.

8. The identification apparatus of claim 1, wherein said identification document comprises a first layer, a second layer disposed on said first layer, said second layer being transparent and forming the uppermost layer as viewed by an observer; and a third layer disposed between said first and second layers, said third layer being transparent and including said hologram.

9. The identification apparatus of claim 8, wherein any layer of said identification document disposed below the layer including said hologram is transparent at least within the area below said hologram.

10. The identification apparatus of claim 1, wherein said identification document comprises a first layer and a second layer disposed on said first layer, and including said hologram, said second layer being transparent and forming the uppermost layer as viewed by an observer.

11. The identification apparatus of claim 10, wherein any layer of said identification document disposed below the layer including said hologram is transparent at least within the area below said hologram.

12. Identification apparatus comprising:
 (a) an identification document carrying visual data as well as invisible features in the form of a hologram provided on said identification document, wherein at least portions of said visual data are identically reproduced as holographic data in said hologram;
 (b) and a display unit for displaying the information contained on said identification document with simultaneous visual display of the visual data and holographic data in closely adjacent relationship to permit verification of conformity of the holographic and visual data, wherein said display unit comprises:
  (1) a monochromatic light source for reconstructing said hologram;
  (2) an optical arrangement for projecting the reconstructed holographic image onto a location where it may be observed together with said visual data;
  (3) a screen, said optical arrangement projecting said reconstructed holographic image onto a first portion of said screen; and
  (4) a further optical arrangement for projecting an image of said visual data onto a second portion of said screen immediately adjacent said first screen portion.

13. The identification apparatus of claim 12, wherein said hologram contains an image of said visual data.

14. The identification apparatus of claim 13, wherein said hologram contains an image of the person to be identified.

15. The identification apparatus of claim 13, wherein said identification document comprises a first layer, a second layer disposed on said first layer, said second layer being transparent and forming the uppermost layer as viewed by an observer; and a third layer disposed between said first and said second layers, said third layer being transparent and including said hologram.

16. The identification apparatus of claim 15, wherein any layer of said identification document disposed below the layer including said hologram is transparent at least within the area below said hologram.

17. The identification apparatus of claim 13, wherein said identification document comprises a first layer and a second layer disposed on said first layer, and including said hologram, said second layer being transparent and forming the uppermost layer as viewed by an observer.

18. The identification apparatus of claim 17, wherein any layer of said identification document disposed below the layer including said hologram is transparent at least within the area below said hologram.

19. The identification apparatus of claim 12, wherein said identification document comprises a first layer, a second layer disposed on said first layer, said second layer being transparent and forming the uppermost layer as viewed by an observer; and a third layer disposed between said first and second layers, said third layer being transparent and including said hologram.

20. The identification apparatus of claim 19, wherein any layer of said identification document disposed below the layer including said hologram is transparent at least within the area below said hologram.

21. The identification apparatus of claim 12, wherein said identification document comprises a first layer and a second layer disposed on said first layer, and including said hologram, said second layer being transparent and forming the uppermost layer as viewed by an observer.

22. The identification apparatus of claim 21, wherein any layer of said identification document disposed below the layer including said hologram is transparent at least within the area below said hologram.

23. A display unit for displaying the information contained on an identification document partly in the form of visual data and partly in the form of a hologram, comprising:
 (a) means for receiving said identification document, said receiving means being sized so as to receive only the portion of said identification document containing said hologram while leaving the portion carrying said visual data outside said display unit for direct observation;
 (b) a monochromatic light source for reconstructing said hologram; and
 (c) an optical arrangement for projecting the reconstructed holographic image onto a location where it may be observed together with said visual data.

24. A display unit for displaying the information contained on an identification document partly in the form of visual data and partly in the form of a hologram, comprising:
 (a) a monochromatic light source for reconstructing said hologram;
 (b) a screen;
 (c) an optical arrangement for projecting the reconstructed holographic image onto a first portion of said screen; and
 (d) a further optical arrangement for projecting an image of said visual data onto a second portion of said screen immediately adjacent said first screen portion.

25. The display unit of claim 24, wherein said screen comprises a vibrating ground-glass screen.

26. The display unit of claim 24, wherein said screen comprises a liquid crystal.

27. A method for displaying information contained on an identification document partly in the form of visual data and partly in the form of a hologram, wherein said visual data and the information contained in said hologram are projected in substantially equal size onto a common screen in adjacent relationship so as to allow said data and information to be simultaneously observed and directly compared with each other.

28. The method of claim 27, wherein said information in the form of a hologram includes the information in the form of visual data.

* * * * *